M. W. WITHAM.
CAR WHEEL.
APPLICATION FILED JUNE 15, 1917.
1,254,557.
Patented Jan. 22, 1918.
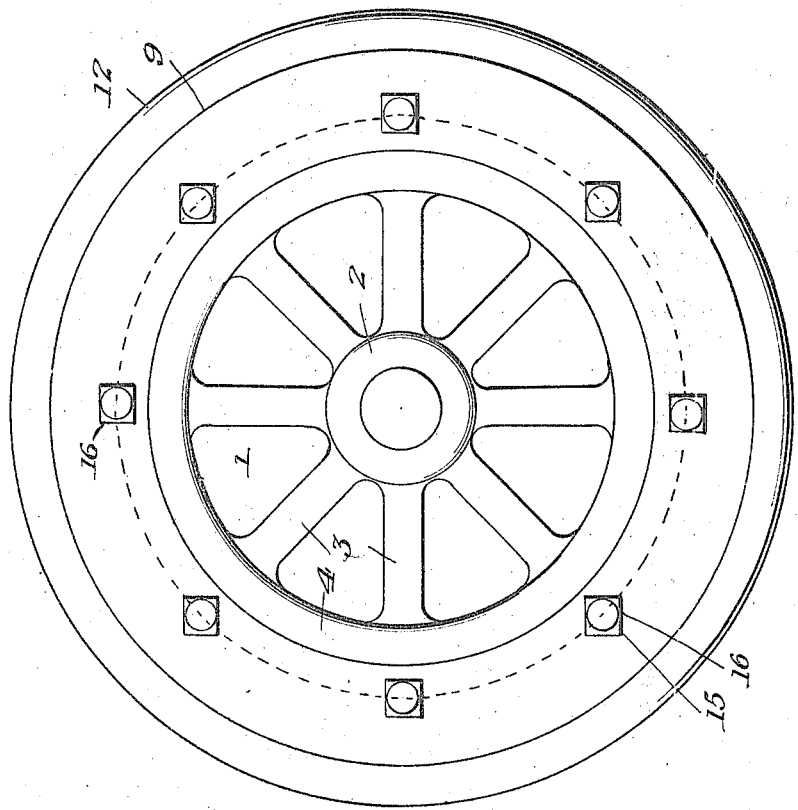
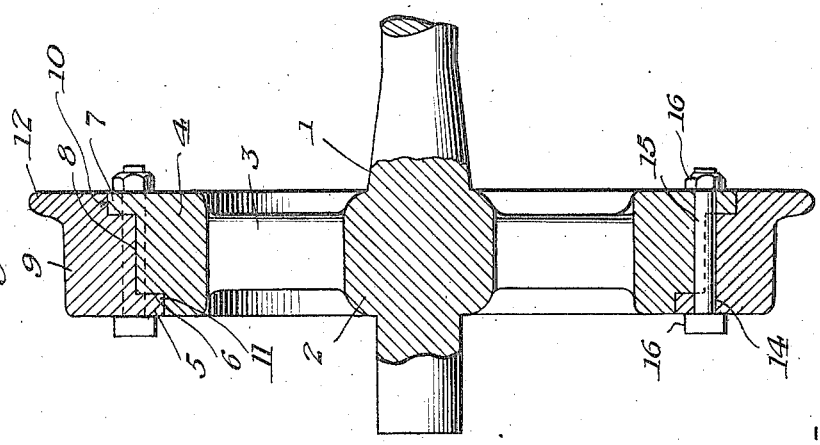
WITNESSES
I. A. Haxton.
D. B. Phillips.
INVENTOR
M. W. Witham
BY Victor J. Evans
ATTORNEY

UNITED STATES PATENT OFFICE.

MARK W. WITHAM, OF PORTLAND, MAINE.

CAR-WHEEL.

1,254,557.  Specification of Letters Patent.  Patented Jan. 22, 1918.

Application filed June 15, 1917.  Serial No. 174,940.

*To all whom it may concern:*

Be it known that I, MARK W. WITHAM, a citizen of the United States, residing at Portland, in the county of Cumberland and State of Maine, have invented new and useful Improvements in Car-Wheels, of which the following is a specification.

This invention pertains to improvements in car-wheels, and particularly to car-wheels having separately-formed treads or ties.

The primary object of the invention is to provide a wheel wherein relative movement of the center and the tread is more effectually prevented.

Other objects are, to simplify the construction and reduce the cost of manufacture of the wheel.

With these objects in view and others which will hereinafter become evident, I have incorporated my invention in the preferred form described in the specification, set forth in the claim, and delineated in the drawings, in which—

Figure 1 is a transverse sectional view.

Fig. 2 is a side elevation.

In the drawings the numeral 1 designates the wheel-center which is preferably cast in one piece in the usual manner and is provided with the customary hub 2 and spokes 3 extending outwardly for terminal connection to the rim 4. The rim 4 is formed in the outer edge of the periphery with an annular channel to form a shoulder 6 perpendicular to the axis of the wheel, and adjacent the other edge of the periphery with a flange 7 preferably rectangular in section and perpendicular to the axis of the wheel, while the portion 8 of the rim between the channel 5 and flange 7 is preferably cylindrical. The tire 9 may be turned from a forging and is formed in one edge of the inner circumference with a channel 10 adapted to receive the flange 7 and adjacent the other edge with a flange 11 adapted to coincide with the channel 5. The outer circumference or tread has the usual flange 12 for engaging a rail; and the tire is preferably made somewhat undersize and shrunk or forced by hydraulic pressure on the rim as commonly practised.

The flange 11 is formed parallel to the axis with an annular row of bores prolonged to form channels in the adjacent circumferential portion 8 of the center 1 with similar bores and channels to constitute openings 14 for receiving securing means shown as bolts 15. The bolts 15 lie half in the rim 4 and half in the tire 9 and constitute keys whereby relative rotation of the tire and rim is prevented; and by means of a nut 16 screw threaded on the projecting shank of each bolt 15 the adjacent shoulders of the tire and rim are drawn into clamping engagement to further assist in preventing relative movement of the tire and rim.

It is to be understood that the herein described embodiment of the invention comprises only one of many and varied forms comprehended within the spirit of the invention, and the right is reserved to such variation, modification, and use of equivalents, as may fall within the scope of the claim.

I claim:

A wheel comprising a central part having a cylindrical rim provided with an annular recess in one edge and a cylindrical flange at its other edge, the adjoining walls of said parts being at right angles to each other, and a tread provided with a cylindrical inner circumference having an annular recess in one edge and a cylindrical flange at its other edge, the adjoining walls of said parts being at right angles to each other, said flanges having holes therein and the cylindrical rim and circumference having transverse grooves therein registering with said holes when the flange on one member is in engagement with the annular recess on the other member, said channels being of greater longitudinal length than the holes, and bolts passing through said holes and channels.

In testimony whereof I affix my signature.

MARK W. WITHAM.